Fig. 1

INVENTORS
Oliver K. Kelley, &
BY Douglas T. Lewis
R. L. Spencer
ATTORNEY

INVENTORS
Oliver K. Kelley, &
BY Douglas T. Lewis
R. L. Spacen
ATTORNEY

Oct. 31, 1961    O. K. KELLEY ET AL    3,006,206
INFINITELY VARIABLE RATIO TRANSMISSION
Filed Feb. 5, 1959    5 Sheets-Sheet 5

Fig. 10

INVENTORS
Oliver K. Kelley, &
BY Douglas T. Lewis
R. L. Spencer
ATTORNEY

United States Patent Office 3,006,206
Patented Oct. 31, 1961

3,006,206
INFINITELY VARIABLE RATIO
TRANSMISSION
Oliver K. Kelley, Bloomfield Hills, and Douglas T. Lewis, Royal Oak, Mich., assignors to General Motors Corporation, Detroit, Mich., a corporation of Delaware
Filed Feb. 5, 1959, Ser. No. 791,448
20 Claims. (Cl. 74—190.5)

This invention relates to a transmission and control system and more particularly to a transmission of the infinitely variable type particularly adapted for use in automotive vehicles.

The infinitely variable transmission of the present disclosure is of the type having a series of flanged discs splined to a power delivery shaft and a series of conical discs meshed with the mating flanged discs carried on a shaft supported in a carrier pivoted in the transmission case so that the carrier in its pivotal movement is capable of moving the cones in and out with respect to the discs without changing the contact-load symmetry of the discs. The cone contact radius may be altered while the disc radius remains constant to vary the transmission torque ratio. The transmission torque ratio is represented by the fraction wherein the numerator is the disc contact radius and the denominator is the cone contact radius. Due to the cone angle, the discs move axially on the power delivery shaft as the cones are moved with respect to the discs to vary the transmission torque ratio. One of the critical problems arising in this type of transmission is to provide power loading of the cones and discs to prevent slip and consequent engine run-away under all conditions of operation without applying undue loading force under certain conditions of operation. To apply a variable normal load on the friction contacts between the cones and discs, hydraulic fluid pressure responsive pistons are provided at each end of the output shaft. Regulated hydraulic pressure is supplied to these pistons to provide a contact loading system which is speed responsive and not torque responsive.

An object of this invention is to provide an improved friction drive transmission of the continuously variable type, the drive ratio of which may be externally controlled to accomplish more flexible and economical engine operation than that possible with transmissions incorporating gears or a hydraulic torque converter to establish changes in drive ratio.

An additional object of this invention is to provide an infinitely variable friction drive transmission for use in automotive vehicles incorporating an improved control for regulating the load applied to the contact surface of the variable ratio mechanism incorporated in the transmission.

Another object of this invention is to provide an infinitely variable transmission incorporating fluid pressure responsive means for loading the contact surfaces of the infinitely variable mechanism incorporated in the transmission.

A further object of this invention is to provide in an infinitely variable transmission, a speed responsive feedback control, as distinguished from a torque responsive control, for providing correct contact loading of the intermeshing friction parts of the infinitely variable ratio mechanism.

A more particular object of this invention is to provide a hydraulic control for controlling the contact loading of the intermeshing friction parts of the variable ratio mechanism wherein the fluid pressure utilized is determined by deriving a shaft speed which is the correct output shaft speed from the input shaft speed and by comparing the actual output shaft speed to control the pressure supplied to the loading mechanism.

Another object of this invention is to provide an improved position control for controlling the transmission drive ratio.

A further object of this invention is to provide an improved position control for controlling the transmission drive ratio incorporating a pressure control valve for controlling the pressure supplied to a drive ratio position piston and in which the pressure control valve is controlled hydraulically by two variable hydraulic pressures.

An additional object of this invention is to provide an improved drive ratio control incorporating a hydraulic servo actuator for controlling a movable carrier and wherein there is provided a drive ratio control valve mechanically connected to the carrier and to a movable member having control chambers at opposite sides thereof, and wherein one control chamber is supplied with variable fluid pressure which varies with engine torque demand and the other control chamber is supplied with variable pressure which increases with increase in vehicle speed.

These and other objects of this invention will be apparent from the following description and claims, taken in conjunction with the accompanying drawings, in which:

Figure 1:
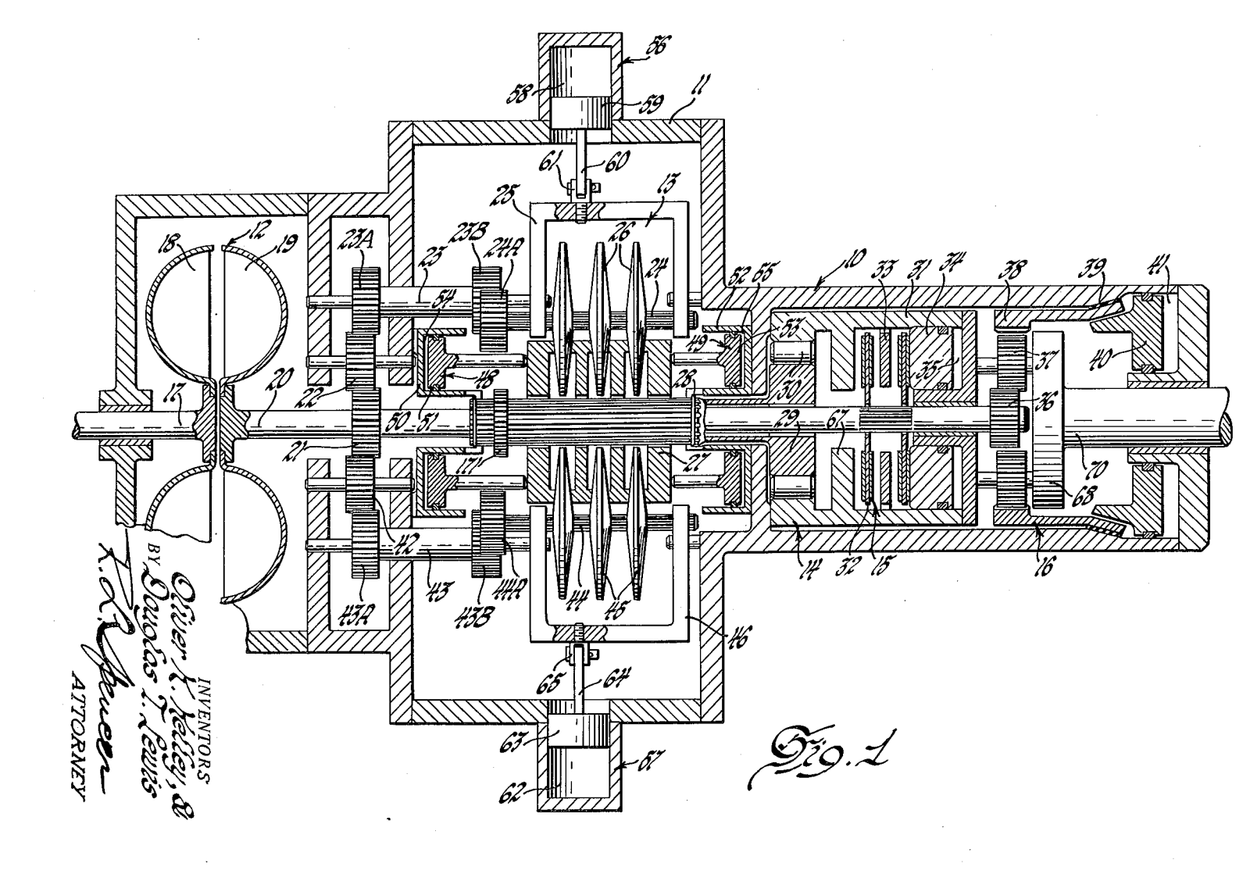
FIGURE 1 is a schematic longitudinal section of a transmission incorporating the principles of this invention.

Referring to FIGURE 1 there is shown a schematic diagram of a friction type infinitely variable transmission particularly adapted for use in automotive vehicles and constructed in accordance with the principles of this invention.

As shown, the transmission indicated generally at 10 includes a fixed housing 11 enclosing a fluid coupling unit, an infinitely variable friction drive unit, a pair of clutches, and a reverse gear unit indicated generally at 12, 13, 14, 15 and 16, respectively. An engine driven shaft 17 drives an impeller 18 of fluid coupling unit 12. Impeller 18 drives a turbine 19, which in turn drives a power input shaft 20 of the transmission. Input shaft 20 extends through a quill shaft 28 to the clutch unit 15 and reverse gear unit 16. A gear 21, a plurality of clutch plates 32 and a sun gear 36 are supported for rotation with shaft 20. Clutch plates 32 are splined to shaft 20 so as to be axially movable thereon and to be driven by shaft 20. A driven power delivery quill shaft 28 supported for rotation on shaft 20 carries a series of discs 27 splined thereto for axial motion on the shaft and also carries a drive hub 29 of one-way clutch unit 14. A gear 171 is fixed for rotation with shaft 28 for purposes hereafter more fully explained. An engine driven power input shaft 24 supported in a carrier 25 is driven from shaft 20 by means of gear 21, an idler gear 22 and a gear unit 23 in mesh with a gear 24A fixed to shaft 24. Gear unit 23 includes gears 23A and 23B fixed for rotation with each other. Idler gear 22 and carrier 25 are supported in fixed housing 11, the carrier 25 being rotatable about the axis of rotation of gear unit 23 so that gears 23B and 24A will remain in mesh as the cradle is rotated about its pivotal axis. A series of cone discs 26 are splined to shaft 24 so as to be driven by shaft 24 and to be axially movable on the shaft. Shafts 20 and 24 each constitute engine driven power input shafts, the shaft 24 being driven by shaft 20, while the quill shaft 28 constitutes a power delivery shaft for the friction drive mechanism. Cones 26 frictionally engage conical surfaces provided on discs 27 to frictionally drive the discs 27 and quill shaft 28. A second set of cones 45 are splined to a shaft 44 supported for rotation in a cradle 46. An idler gear 42 meshes with drive gear 21 and a gear 43A of a gear unit 43. A gear 43B of gear unit 43 meshes with gear 44A fixed to shaft 44 to drive the shaft 44. Cradle 46 is supported for rotation about the axis of rotation of gear unit 43.

Contact loading servos 48 and 49 are provided at each end of the disc assembly to insure adequate normal contact loading of the friction cones and discs. Servo 48 comprises a cylinder 50 fixed to shaft 28 and having a piston 51 disposed therein. Servo 49 comprises a cylinder 52 fixed to shaft 28 and having a piston 53 disposed therein. Servo chambers 54 and 55 of servos 48 and 49, respectively, are adapted to receive fluid under pressure to control the normal contact loading force applied to discs 27. Regulated oil pressure is supplied to servo chambers 54 and 55 in a manner hereafter more fully explained.

Carriers 25 and 46 are moved about their pivotal axes, respectively, by means of servos 56 and 57. A servo chamber 58 on housing 11 has a piston 59 disposed therein, the piston 59 being connected to carrier 25 through a piston rod 60 and a clevis 61. A servo chamber 62 on housing 11 encloses a piston 63 connected to cradle 46 through a piston rod 64 and a clevis 65. Regulated fluid pressure is supplied to servo chambers 58 and 62 to pivot carriers 25 and 46 about their pivotal axes to vary the drive ratio of the friction drive. The position pistons 59 and 63 are opposed by an outward force on cones 26 and 45 arising from the contact loading of the cones and discs by servo pistons 51 and 53.

Power delivery quill shaft 28 is operatively connected to a final power delivery shaft 70 by means of a one-way clutch 30, clutch drum 31, and a planet carrier 68 fixed to shaft 70. Clutch drum 31 is shaped to provide a servo chamber 35 having a clutch actuating piston 34 therein and carries a clutch plate 33 and clutch backing member 67. Shaft 20 has a pair of clutch plates 32 splined thereto so as to be driven by shaft 20 and axially movable on the shaft. Clutch plate 33 is splined to drum 31 so as to be rotatable with the drum and axially movable on the drum. Fluid under pressure may be admitted to servo chamber 35 to engage clutch unit 15 to provide direct drive of shaft 70 and to cut out the friction drive from the drive train. Planet carrier 68 fixed to output shaft 70 supports a plurality of planet gears 37 in mesh with a sun gear 36 and a ring gear 38. A cone brake 39 may be engaged by a piston 40 disposed in a servo chamber 41 to establish reverse drive of shaft 70 when fluid under pressure is admitted to servo chamber 41. Reverse drive of shaft 70 is obtained by braking ring gear 38 against rotation and releasing the hydraulic pressure from servos 54 and 55. Sun gear 36 drives planet gear 37, causing gear 37 to walk around reaction gear 38, carrying planet carrier 68 and shaft 70 in revse drive.

*Control system*

Figure 2:
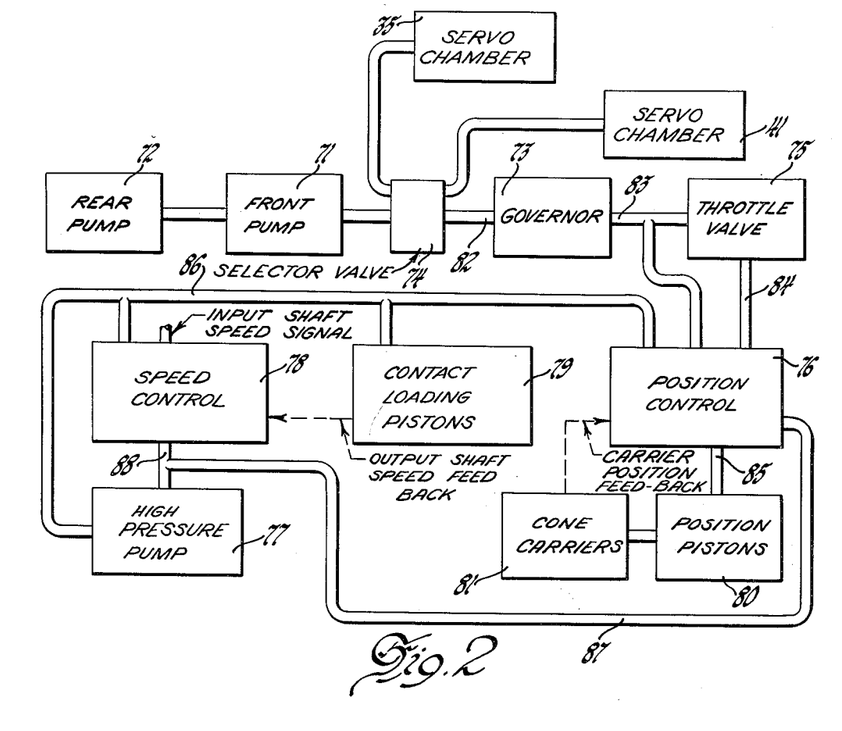
FIGURE 2 is a schematic diagram of a control system for use in this transmission.

The control system for controlling the friction loading of the cones 26 and discs 27, the drive ratio afforded by the friction drive and the clutch unit 15 and reverse unit 16 of FIGURE 1 is shown schematically in FIGURE 2. As shown in FIGURE 2, a governor 73 is supplied with fluid under pressure from a pair of pumps 71 and 72. Pump 71 is engine driven and pump 72 is driven by output shaft 70 of FIGURE 1. Governor 73 is of a well known type of governor adapted to deliver fluid under pressure which varies with speed of rotation of input shaft 20. The pressure delivered by governor 73 increases with increase in speed of rotation of shaft 20 and decreases as the speed of rotation of shaft 20 decreases. A manually operable selector valve 74 may be selectively positioned by the vehicle operator to direct line pressure from pumps 71 and 72 to servo chamber 35 of FIGURE 1 for direct drive of shaft 70, or to servo chamber 41 of FIGURE 1 for reverse drive of shaft 70. When servo chambers 35 and 41 are connected to exhaust by manual valve 74, the friction drive mechanism drives shaft 70 through one-way clutch 30 of FIGURE 1. Governor pressure is delivered to an accelerator pedal controlled throttle valve 75 and to a position control mechanism 76 to control the transmission drive ratio as hereafter more fully explained. An engine driven pump 77 which is a high pressure pump adapted to deliver pressure approximately nine times as high as the pressure supplied by pumps 71 and 72, delivers high pressure to a speed controlled mechanism 78, which functions to control the pressure in the contact loading servos 48 and 49 of FIGURE 1 and to supply pressure to a valve (see valve 135 of FIGURE 4) of the position control mechanism 76. The contact loading pistons which correspond to servos 48 and 49 of FIGURE 1, are indicated schematically at 79 in FIGURE 2. Position pistons 59 and 63 of FIGURE 1 are shown schematically at 80 in FIGURE 2. Cone carriers 25 and 46 of FIGURE 1 are shown schematically at 81 in FIGURE 2. Governor 73 is supplied with line pressure from line pressure passage 82. Throttle valve 75 and position control mechanism 76 receive governor pressure from governor pressure delivery passage 83. Throttle valve 75 delivers variable pressure to position control mechanism 76 through throttle valve delivery passage 84. Position control mechanism 76 delivers a controlled pressure to the position pistons indicated at 80 through a passage 85. A delivery passage 86 for high pressure pump 77 delivers fluid pressure to the contact loading pistons indicated at 79, to position control mechanism 76, and to the speed control device 78. The function of the speed control device is to regulate the pressure maintained in passage 86. Passages 87 and 88 are exhaust passages leading to the intake of high pressure pump 77.

Figure 3:
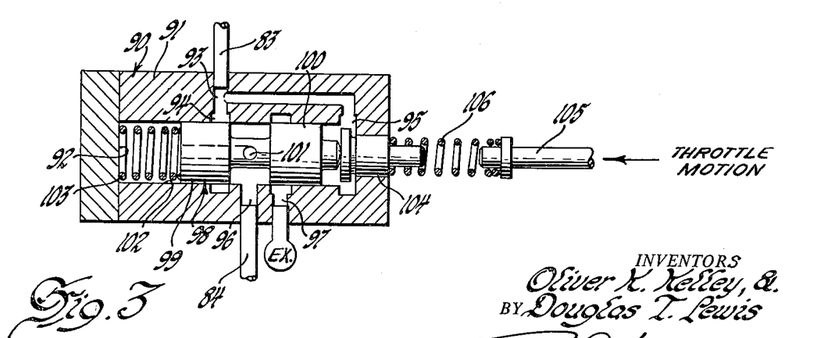
FIGURE 3 is a longitudinal section of an accelerator pedal controlled pressure metering valve.

Referring to FIGURE 3, there is shown an accelerator pedal controlled throttle valve indicated generally at 90 which includes a casing 91 having a bore 92 therein. A passage 93 which communicates with governor pressure delivery passage 83 delivers governor pressure to ports 94 and 95. Port 96 is the throttle valve pressure delivery port and port 97 connects to exhaust. A valve member 98 is composed of spaced lands 99 and 100 and is drilled at 101 to admit throttle valve pressure to a chamber 102 at one end of valve 98. A spring 103 acting on land 99 yieldably biases valve 98 to block off governor pressure supply port 94 and to connect port 96 to exhaust port 97. An actuator plug 104 may apply force to land 100 in response to movement of an accelerator pedal actuated member 105, there being a spring 106 positioned between members 105 and 104. Movement of the accelerator pedal (not shown) towards a throttle opening position will move valve 98 to the left to connect port 94 to throttle valve delivery port 96. Throttle valve pressure is also admitted to spring chamber 102 through passage 101, the pressure in chamber 102 acting in assistance to spring 103 to move valve 98 to the right to block off port 94 from port 96. The effective pressure delivered by valve 98 to passage 84 increases as the accelerator pedal if moved to open the throttle and decreases as the accelerator pedal is retarded. Throttle valve pressure is delivered to the position control mechanism through passage 84.

Figure 4:
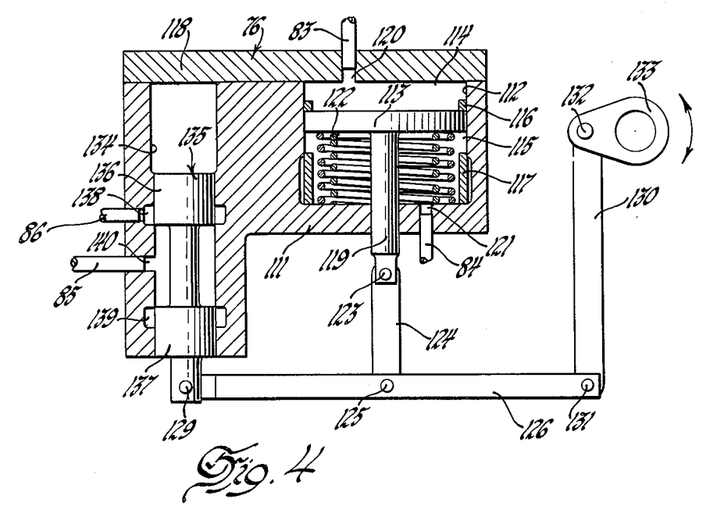
FIGURE 4 is a partially sectional view of a drive ratio control valve and the servo and linkage for actuating the valve.

Referring to FIGURE 4, there is shown the position control servo mechanism 76 for controlling the pressure supplied to the position control servos 56 and 57 of FIGURE 1 and which are indicated at 80 in FIGURE 2 to control the transmission drive ratio. A servo case 111 is provided with a bore 112 having a piston 113 disposed therein and dividing the bore into chambers 114 and 115. Shift stops 116 and 117 are disposed in bore 112 to limit the permissible range of movement of piston 113. A cover 118 closes off one end of bore 112 to complete servo chamber 114. A piston rod 119 extends outwardly from servo chamber 115 as shown. Governor pressure from governor 73 of FIGURE 2 is admitted to chamber 114 through governor pressure delivery passage 83 and a port 120. Throttle valve pressure is delivered to chamber 115 through passage 84 of FIGURE 2 and a port 121. A compound spring 122 in chamber 115 yieldably biases piston 113 against stop 116. The compound spring 122 is provided with a spring rate which approximately matches the governor pressure curve so that, for a given throttle setting with a consequent constant throttle valve pressure in chamber 115 automatic upshifts of transmission drive ratio will occur as output shaft speed is increased from zero, and automatic downshifts of transmission drive ratio will occur as output shaft speed returns to zero. The compound spring also assures that the transmission will always be in its downshift setting for maximum torque for starting. Shift stops 116 and 117 limit the maximum and minimum ratios and eliminate the need for mechanical stops on the position pistons 59 and 63 of FIGURE 1.

Fluid pressure delivered to servo chambers 58 and 62 of FIGURE 1 through passage 85 is controlled by a valve 135 disposed in a bore 134 in housing 111. Valve 135 extends outwardly from housing 111 and is operatively connected to a link 126 by a pin connection 129. Servo piston rod 119 is connected to a link 126 by a link 124 pinned to piston rod 119 and 123 and pinned to link 126 at 125. Link 126 is connected to carrier 25 at the center line of the carrier pivot by means of a link 130 pinned to link 126 at 131 and pinned to a lever 133 at 132. Lever 133 is fixed for rotation with carrier 25 so that lever 133 rotates about the center line of the carrier pivot as the carrier is moved. Valve 135 includes spaced lands 136 and 137 for controlling ports 138 and 139, respectively. High pressure from pump 77 is delivered to port 138 through passage 86 of FIGURE 2. Port 139 is an exhaust port. Port 140 is the pressure delivery port whereby fluid pressure is delivered to servo chambers 58 and 62 of FIGURE 1 through passage 85 of FIGURE 2.

The position of valve 135, and consequently the pressure delivered to passage 85 is determined by the position of piston 113 in bore 112 and the position of carrier 25 about its pivotal axis. The links 133 and 130 acting upon link 126 provide a carrier position feedback signal or control on valve 135. It will be understood that compound spring 122 and throttle valve pressure acting in spring chamber 115 bias piston 113 toward stop 116 which limits the maximum transmission drive ratio. Governor pressure in chamber 114 biases piston 113 toward stop 117 which limits the minimum transmission drive ratio. Thus, for a given throttle valve setting and a constant throttle valve pressure in chamber 115, governor pressure which increases with increase in vehicle speed acting in chamber 114 will move piston 113 against spring 122 and the effect of throttle valve pressure with a consequent instantaneous movement of valve 135 to block off port 138 and to momentarily crack port 139 to reduce the pressure in passage 85 and servo chambers 58 and 62 of FIGURE 1. This reduction in pressure in servo chambers 58 and 62 permits the carriers 25 and 46 to pivot outwardly to reduce the transmission drive ratio. As the carrier 25 swings outwardly about its pivotal axis, links 133, 130 and 126 move valve 135 to block off exhaust port 139 and to maintain pressure in passage 85 which is lower than that previously delivered to passage 85. Considering a decrease in vehicle speed, governor pressure in chamber 114 will decrease such that spring 122 and throttle valve pressure will bias piston 113 toward stop 116. Valve 135 is thereby moved through links 124 and 125 to connect port 138 to port 140 to increase the pressure in passage 85 and servo chambers 58 and 62. Carriers 25 and 46 are thereupon rocked about their pivotal axis to increase the transmission drive ratio. As the carriers rotate, the follow up linkage including links 133 and 130 act on link 126 to position valve 135, block off port 138 and port 139. In the initial stage of operation, both on upshifts and downshifts, piston 119 causes link 126 to pivot about pin 131. In the second stage of operation, both on upshift and downshift, follow up links 133 and 130 cause link 126 to pivot about pin 125.

Throttle valve pressure in chamber 115 serves two functions. In certain speed ranges of the vehicle, the throttle valve pressure plus the effect of spring pressure from spring 122 may be effective to overcome the effect of governor pressure on piston 113 to provide a forced downshift of transmission drive ratio. This forced downshift is obtained by advancing the engine throttle accelerator pedal. At more retarded accelerator pedal settings, throttle valve pressure acts merely to delay the upshift of transmission drive ratio.

*Contact loading system*

The contact loading system for controlling the contact loading pressure supplied to contact load servos 48 and 49 of FIGURE 1 incorporates a pressure conutrol valve which is controlled through a speed function rather than a torque function. Errors in output shaft speed are utilized to correct the contact loading of the cones and discs. Essentially the control produces, from input shaft speed, a shaft speed which is the correct output shaft speed for any given drive ratio. The actual output shaft speed is compared with the correct output shaft speed for the given drive ratio, and any difference is used to adjust a pressure control valve to modify the pressure delivered to the contact load servos so as to reduce the speed error to zero.

Figure 5:
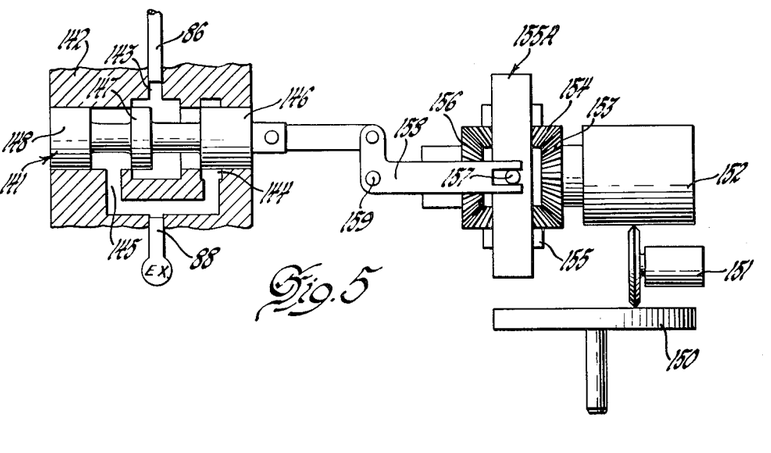
FIGURE 5 is a schematic diagram of a speed control mechanism and a valve controlled thereby for regulating the fluid pressure supplied to the contact loading servos of FIGURE 1.
Figure 6:
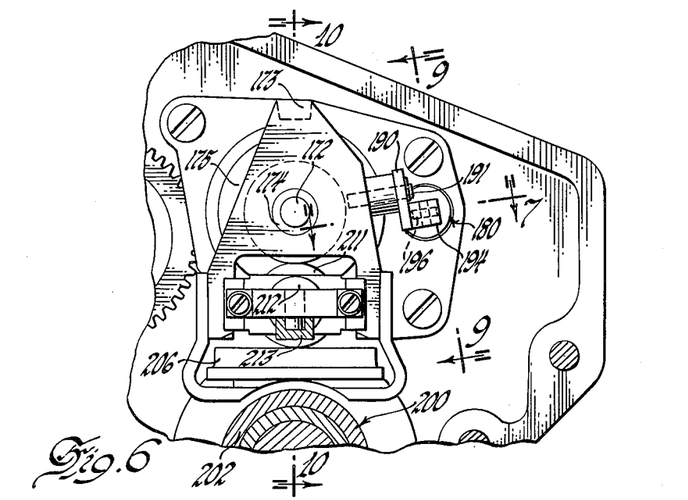
FIGURE 6 is an end view of a friction roller type differential unit illustrating the linkage between the differential carrier and the pressure regulator valve of FIGURE 7.

Referring to FIGURE 5 there is shown schematically the speed responsive feedback control indicated at 78 in FIGURE 2. The control serves to regulate the pressure in passage 86 which is supplied to the contact loading pistons 51 and 53 of FIGURE 1 as a speed function rather than a torque function. As shown in FIGURE 5 the control for valve 141 includes a variable speed friction drive including a plate 150 driven proportional to the speed of rotation of shaft 24 of FIGURE 1, a roller 151 positioned by a cam actuated by the position of cone shaft carrier 25 of FIGURE 1 in such a way that the roller speed of rotation is the output shaft speed required, by any given cone position, to give optimum efficiency with stability. Roller 151 drives a drum 152 which rotates at the correct output shaft speed for any given transmission drive ratio. Drum 152 drives a bevel gear 153 which meshes with bevel gears 154 and 155 of a bevel gear differential unit indicated generally at 155A. Gear 156 which meshes with gears 154 and 155 is driven at actual output shaft speed, but in the opposite direction of rotation to that of drum 152 and gear 153. Any difference in the speed of rotation of gears 153 and 156 will cause the differential carrier 157 to rotate. A bell crank lever 158 is fixed to pivot about a pivot pin 159 and is operatively connected to differential carrier 157 and valve 141 to control the position of valve 141 in casing 142. Valve 141 includes three spaced lands 146, 147 and 148 of equal diameter. Valve casing 142 is provided with ports 143, 144 and 145. Port 143 connects to high pressure passage 86 of FIGURE 2. Ports 144 and 145 connect to an exhaust passage 88. Valve 141 regulates the contact pressure supplied to the contact loading pistons 51 and 53 of FIGURE 1 through passage 86 of FIGURE 2 to provide sufficient contact loading pressure on the cams and discs to prevent slippage in the friction drive at any drive ratio and at the same time to prevent overloading and excessive contact pressure on the cams and discs irrespective of drive ratio. In the event of slippage of the friction members, the actual output shaft speed and consequently the speed of rotation of gear 156 will drop below the correct output shaft speed (for any given drive of gear 156 will drop below the correct output shaft speed (for any given drive ratio) at which gear 153 is rotating. In this event, differential carrier 157 will move valve 141 to increase the pressure in passage 86 by increasing the restriction to flow of fluid through port 143 to exhaust passage 88. It is apparent that the control of the contact load pressure is extremely sensitive since it operates on any difference in speed of rotation of gears 154 and 156 whatever, no matter how slight the magnitude, so that the dynamic response is excellent.

Figure 10:
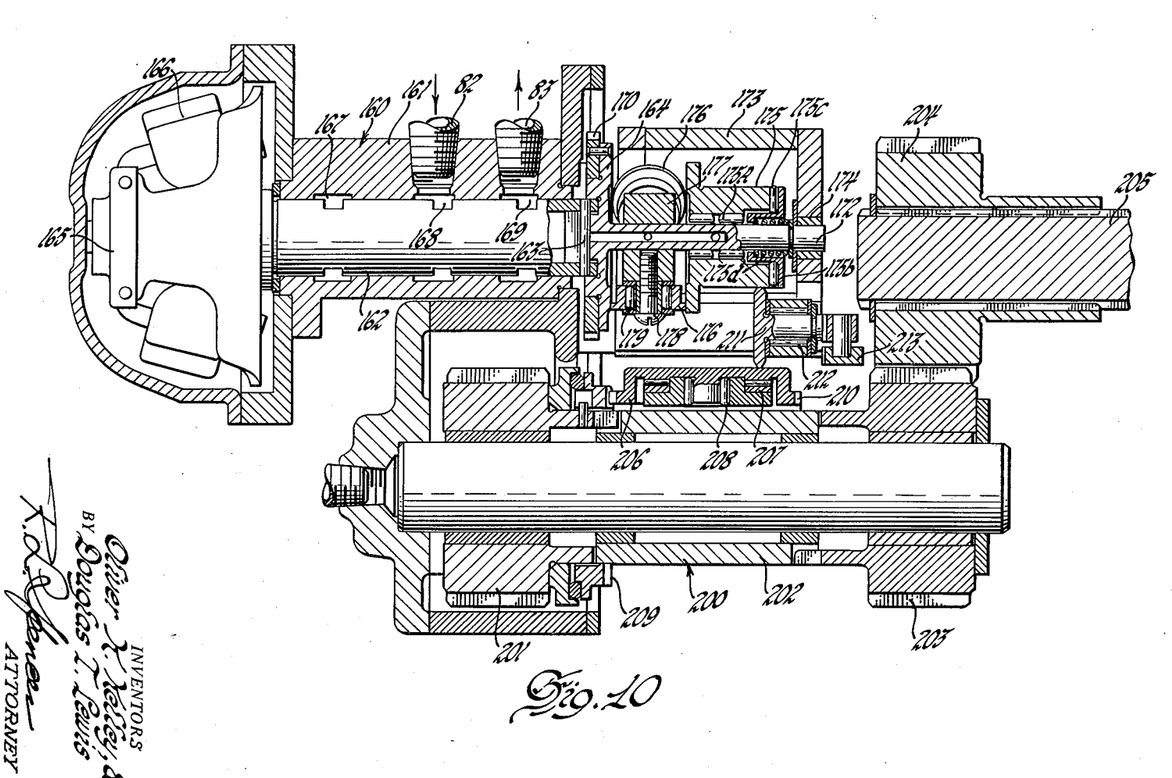
FIGURE 10 is a sectional view of a differential and governor assembly.

In FIGURE 10 there is shown a governor and differential assembly embodying the principles of the schematic illustration of the contact-load pressure control of FIGURE 5. As shown, a governor indicated generally at 160 includes a housing 161 containing a sleeve 162 pinned to a drive plate 164 by a pin 163 for rotation therewith. Sleeve 162 is hollow and carries therein a governor valve (not shown) movable within sleeve 162 for controlling the governor pressure delivered by the governor in accordance with changes in speed of rotation of sleeve 162. The governor valve, not shown, is actuated by weights 166 pivotally mounted on a rotatable collar 165, the collar 165 being fixed to hollow sleeve 162 for rotation therewith. Housing 161 is provided with ports 167, 168 and 169. Port 167 is an exhaust port. Port 168 connects to line pressure passage 82 of FIGURE 2. Port 169 is connected to governor pressure delivery passage 83 of FIGURE 2. The governor valve, not shown, is of a standard and well known construction and is arranged to deliver a variable fluid pressure to passage 83, the governor pressure in passage 83 increasing with increase in speed of rotation of sleeve 162. Plate 164 carries a gear 170 driven by a gear 171 (see FIGURE 1) an output shaft 28 so that plate 164 is driven at output shaft speed. The governor delivers governor pressure which increases with speed of rotation of output shaft 28 and decreases with decrease in speed of rotation of output shaft 28. A stem or shaft 172 fixed to plate 164 is rotatably supported in case 173 by a bearing 174. A drum 175 is rotatably supported upon shaft 174 by suitable bearings 175A. A plurality of friction rollers 176 (preferably three in number) are disposed between plate 164 and the end of drum 175. Each roller 176 is supported in a carrier 177 by means of a mounting screw 178 and a bearing 179. A presser plate 175b is spring biased by a spring 175d to force drum 175 into contact with rollers 176, there being a bearing 175C between one end of drum 175 and presser plate 175b. It will readily be understood that the plate 164, rollers 176 and drum 175 constitute a friction differential unit and that carrier 177 will be caused to rotate in the event that plate 164 and drum 175 are rotated at different speeds of rotation. Differential carrier 177 is operatively connected to a contact pressure control valve 180 of FIGURE 7 to regulate the pressure passage 86 and in the contact pressure servos 48 and 49 of FIGURE 1 as hereafter explained.

Figure 7:
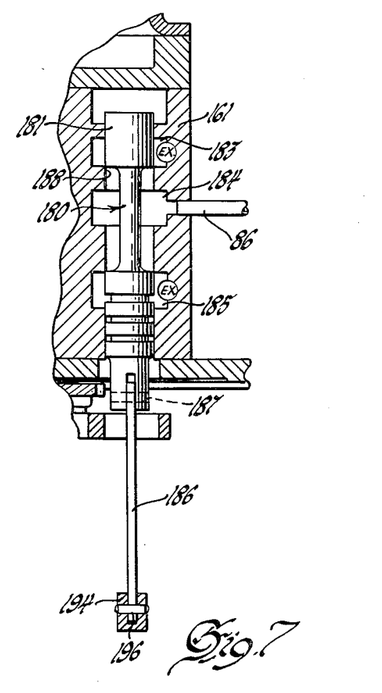
FIGURE 7 is a partially sectional view of a pressure regulator valve for controlling the pressure supplied to the contact loading servos of FIGURE 1.

Referring to FIGURE 7, there is shown a contact pressure control valve 180 disposed in a valve bore 188 in governor casing 161. Valve 180 is composed of a pair of spaced lands 181 and 182 for controlling ports 183, 184, 185. Port 183 exhausts to sump. Port 184 connects to passage 86 of FIGURE 2. Port 185 exhausts to sump. A link 186 secured by a pin 187 to valve 180 is connected to a bell crank lever 190 (see FIGURES 8 and 9) to control the position of valve 180 in bore 179.

Figure 8:
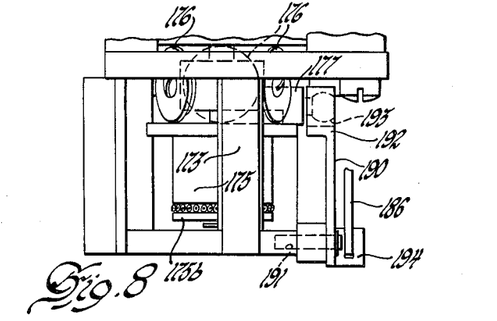
FIGURE 8 is a side view of a friction type differential assembly illustrating the linkage between the differential carrier and the pressure regulator valve of FIGURE 7.
Figure 9:
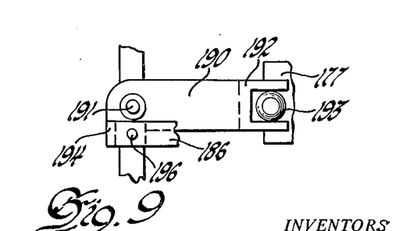
FIGURE 9 is a plan view of the linkage for connecting the differential carrier of FIGURE 8 to the pressure regulator valve of FIGURE 7.

As shown in FIGURES 8, 9 and 10, a bell crank lever 190 is supported on a pivot pin 191 for rotation about pin 191. Lever 190 is bifurcated at 192 to receive a ball 193 fixed to differential carrier 177. A channel 194 fixed to lever 190 is connected to link 186 by a pin 196. It will be understood that rotation of the differential carrier will cause lever 190 to rotate about pin pivot 191 to move valve 180 in bore 188 to vary the pressure in passage 86 of FIGURE 2 and servos 48 and 49 of FIGURE 1. Exhaust ports 183 and 185 are connected to passage 88 of FIGURE 2.

Referring further to FIGURE 10, there is shown a gear unit 200 composed of a gear 201 and a gear 203 joined by a sleeve 202 in such manner that the gears 201 and 203 rotate as a unit. Gear 201 may be driven by idler gear 22 of FIGURE 1 and gear 203 may mesh with a drive gear 204 which corresponds to gear 23 of FIGURE 1. Gear 204 is fixed to a shaft 205 which corresponds to input shaft 24 of FIGURE 1. A plate 206 is rotatably supported in case 173 by means of bearings 207 and 208. A gear 209 pinned to gear 201 for rotation therewith meshes with a gear 210 on plate 206 to rotate the plate in its support bearings. A roller 211 supported in case 173 by a bearing 212 contacts plate 206 and drum 175 to transmit drive from plate 206 to drum 175. Roller 211 is axially movable to the right and to the left along drum 175 to change the speed of rotation of drum 175 with respect to the speed of rotation of plate 206. A cam 213 operatively connected to roller 211 of FIGURE 10 and to the cone shaft carrier 25 of FIGURE 1 moves the roller 211 on plate 206 such that the roller will assume a predetermined position on plate 206 for each position of carrier 25 as carrier 25 is rocked about its pivotal axis so that drum 175 is driven at the correct output shaft speed for any given drive ratio. As heretofore stated, plate 164 is driven at the actual output shaft speed. Any difference in speed of rotation of drum 175 and plate 164 will cause carrier 177 to rotate to actuate the control valve 180 of FIGURE 7 through bell crank lever 190.

The preceeding description recites the advantages, features and useful results of this invention which incorporate a number of features in combination which are subject to change in specific arrangement and form of structure without departing from the spirit and scope of the invention as set forth in the following claims.

What is claimed is:

1. A variable speed friction transmission comprising in combination, an engine power input shaft, a power delivery shaft, first and second friction disc means connected, respectively, to said shafts for rotation therewith and meshing with each other, a pivotally mounted carrier for supporting said engine power driven input shaft for rotation, means for varying the position of said carrier to change the transmission drive ratio, said means including a hydraulic servo operatively connected to said carrier, a source of fluid under pressure adapted to be connected to said servo, and a pressure control valve for controlling the pressure supplied to said servo from said fluid pressure source, said servo being effective to change the position of said carrier to change the transmission drive ratio in response to change in pressure in said servo as determined by said control valve, and fluid pressure responsive means for applying a contact loading force to said discs to prevent slippage of said discs with respect to each other.

2. A variable speed friction transmission comprising in combination, a first engine driven power input shaft, a second power input shaft spaced from said first power input shaft and driven by said first power input shaft, a power delivery shaft adapted to be driven by said second power input shaft comprising a quill shaft supported for rotation on said first power input shaft, first and second friction disc means connected, respectively, to said second power input shaft and to said power delivery shaft for rotation therewith and meshing with each other, a movable member supporting said second engine driven power input shaft for rotation, fluid pressure responsive means for varying the position of said movable support to change the transmission drive ratio, an engine driven pump providing a source of fluid pressure, a pressure control valve for controlling the pressure supplied to said fluid pressure responsive means by said pump, fluid pressure responsive means for applying a contact loading force to said discs to prevent slippage of said discs with respect to each other, and additional valve means for varying the pressure supplied to said last-mentioned fluid pressure responsive means.

3. A variable speed friction transmission comprising in combination, a first engine driven power input shaft, a second power input shaft, a set of friction discs supported upon and driven by said second power input shaft, a quill shaft supported upon and rotatable with respect to said first engine driven power input shaft, a set of friction discs on said quill shaft and in mesh with said first-mentioned set of friction discs for driving said quill shaft, means for applying a contact loading force to said discs to prevent slippage of said discs with respect to each other, a movable carrier forming a support for said second power input shaft, means providing a drive connection between said first and second power input shafts, and means for varying the position of said carrier for changing the transmission drive ratio.

4. A variable speed friction transmission comprising in combination, a first engine driven power input shaft, a second power input shaft, a set of friction discs supported upon and driven by said second power input shaft, a quill shaft supported upon and rotatable with respect to said first engine power input shaft, a set of friction discs on said quill shaft and in mesh with said first-mentioned set of friction discs for driving said quill shaft, means for applying a contact loading force to said friction discs to prevent slippage of said discs with respect to each other, a movable carrier for rotatably supporting said second power input shaft, means providing a drive connection between said first and second power input shafts, means for varying the position of said carrier for changing the transmission drive ratio, a final power delivery shaft, means forming a drive connection between said quill shaft and said final power delivery shaft including a one-way clutch, and selectively operable means for operatively connecting said first engine driven power input shaft to said final power delivery shaft including an engageable and releasable clutch.

5. A variable speed friction transmission comprising in combination, a first engine driven power input shaft, a second power input shaft, a set of friction discs supported upon and driven by said second power input shaft, a quill shaft supported upon and rotatable with respect to said first engine driven power input shaft, a set of friction discs on said quill shaft and in mesh with said first-mentioned set of friction discs for driving said quill shaft, fluid pressure responsive means for applying a contact loading force to said discs to prevent slippage of said discs with respect to each other, a source of fluid pressure connected to said fluid pressure responsive means, means for controlling the pressure applied to said fluid pressure responsive means including a pressure control valve, speed responsive means operatively connected to said pressure control valve for varying the action of said valve to vary the pressure applied to said fluid pressure responsive means, a movable carrier forming a support for said second power shaft, means providing a drive connection between said first and second power input shafts, and means for varying the position of said carrier to change the transmission drive ratio.

6. A variable speed friction transmission for engine driven vehicles comprising in combination, an engine driven power input shaft, a power delivery shaft, first and second friction discs connected, respectively, to said shafts for rotation therewith and meshing with each other, a movable carrier supporting said power input shaft for rotation therein, means for varying the position of said carrier to change the transmission drive ratio including a fluid pressure responsive servo operatively connected to said carrier, a source of fluid under pressure adapted to be connected to said servo and a pressure control valve for controlling the pressure supplied to said servo from said source, said servo being effective to change the position of said carrier to change the transmission drive ratio in response to change in pressure as determined by said control valve, and means for controlling the action of said valve operatively connected to said valve, said means being effective to position said valve to vary the pressure applied to said servo as a function of engine torque demand, vehicle speed, and the position of said carrier.

7. A variable speed friction transmission comprising in combination, an engine driven power input shaft, a power delivery shaft, a first set of friction discs driven by said power input shaft, a second set of friction discs carried by said power delivery shaft for driving said power delivery shaft, the discs on said power input shaft being in mesh with the discs on said power delivery shaft, a movable carrier supporting said power input shaft therein, means for varying the position of said carrier to change the transmission drive ratio, fluid pressure responsive means for applying a contact loading force to said discs to prevent slippage of said discs with respect to each other, a source of fluid pressure connected to said fluid pressure responsive means, a pressure regulator valve for controlling the pressure applied to said fluid pressure responsive means, and speed responsive means operatively connected to said valve for controlling the action of said valve.

8. A variable speed friction transmission comprising in combination, an engine driven power input shaft, a power delivery shaft, a first set of friction discs driven by said power input shaft, a second set of friction discs supported upon said power delivery shaft for driving said power delivery shaft, said discs being in mesh with each other, a movable carrier supporting said power input shaft and said first set of friction discs therein, means for varying the position of said carrier to change the transmission drive ratio, fluid pressure responsive mechanism for applying a contact loading force to said discs to prevent slippage of said discs with respect to each other, a source of fluid pressure connected to said fluid pressure reponsive mechanism, a pressure regulator valve for controlling the pressure applied to said fluid pressure responsive mechanism, and means for controlling the action of said valve including means responsive to the speed of rotation of said power input shaft, means responsive to the speed of rotation of said power delivery shaft and means responsive to the position of said carrier.

9. A variable speed friction transmission comprising in combination, an engine driven power input shaft, a power delivery shaft, a first set of friction discs driven by said power input shaft, a second set of friction discs supported upon said power delivery shaft for driving said power delivery shaft, said discs being in mesh with each other, a movable carrier supporting said power input shaft and said first set of friction discs therein, means for varying the position of said carrier to change the transmission drive ratio, fluid pressure responsive servo mechanism for applying a contact loading force to said discs to prevent slippage of said discs with respect to each other, a source of fluid pressure connected to said servo mechanism, a pressure regulator valve for controlling the pressure applied to said servo mechanism, and means for controlling the action of said valve operatively connected to said valve, said means being effective to position said valve to vary the pressure applied to said servo mechanism as a function of the speed of rotation of said power input shaft, the speed of rotation of said power output shaft, and the position of said carrier.

10. A variable speed friction transmission comprising in combination, an engine driven power input shaft, a power delivery shaft, means forming a drive connection between said shafts comprising sets of intermeshing friction discs carried by and rotatable with said shafts, respectively, a movable carrier supporting said power input shaft and one set of friction discs therein, means for varying the position of said carrier to change the transmission drive ratio, fluid pressure responsive servo mechanism for applying a contact loading force to said discs to prevent slippage of said discs with respect to each other, a source of fluid pressure hydraulically connected to said servo mechanism, a pressure regulator valve for controlling the pressure applied to said servo mechanism, and means for controlling the action of said pressure regulator valve including a differential assembly operatively connected to said valve, said differential assembly including one element thereof driven by said power delivery shaft, said differential assembly including a second element driven by a drum, and means for driving said drum including a disc driven by said power input shaft and a roller, said roller being movable on said disc and said drum in response to change in the position of said carrier to vary the speed of rotation of said drum with respect to the speed of rotation of said disc.

11. A variable speed friction transmission comprising in combination, an engine driven power input shaft, a power delivery shaft, means forming a drive connection between said shafts comprising sets of intermeshing friction discs carried by and rotatable with said shafts, respectively, a movable carrier supporting said power input shaft and one set of friction discs for rotation therein, fluid pressure responsive means for varying the position of said carrier to change the transmission drive ratio, a fluid pressure source, valve means connected to said source and to said fluid pressure responsive means for controlling the admission of fluid pressure to and exhaust of pressure from said fluid pressure responsive means to control the transmission drive ratio, servo means for applying a contact loading force to said discs and connected to said source, and a pressure regulator valve for controlling the pressure applied to said servo means.

12. A variable speed friction transmission comprising in combination, an engine driven power input shaft, a power delivery shaft, means forming a drive connection between said shafts comprising sets of intermeshing friction discs carried by and rotatable with said shafts, respectively, a movable carrier supporting one of said shafts and one set of friction discs for rotation therein, a fluid pressure responsive servo for varying the position of said carrier to change the transmission drive ratio, a fluid pressure source, drive ratio control means including valve means connected to said source and to said servo for controlling the admission of fluid pressure to and exhaust of pressure from said servo, means connecting said valve to said carrier, a servo including a piston connected to said last-mentioned means, control chambers at opposite sides of said piston, means for directing a variable controlled pressure to one of said chambers, the pressure in said control chamber tending to move said piston to downshift the transmission drive ratio, and additional means for directing variable pressure to the other of said control chambers, the pressure in said last-mentioned control chamber tending to move said piston to upshift the transmission drive ratio.

13. A variable speed friction transmission comprising in combination, an engine driven power input shaft, a power delivery shaft, means forming a drive connection between said shafts comprising sets of intermeshing friction discs carried by and rotatable with said shafts, respectively, a movable carrier supporting said power input shaft and one set of said friction discs therein, fluid pressure responsive means for varying the position of said carrier to change the transmission drive ratio, a fluid pressure source, valve means connected to said source and to said fluid pressure responsive means for controlling the admission of fluid pressure to and exhaust of pressure from said fluid pressure responsive means to control the transmission drive ratio, means for controlling said valve including linkage connecting said valve to said movable carrier and a fluid pressure controlled servo, said servo including a piston connected to said linkage, control chambers at opposite sides of said piston, means for directing fluid pressure to one of said control chambers to cause said piston to move said valve to direct pressure to said fluid pressure responsive means to increase the transmission drive ratio, and means for directing fluid pressure to the other of said control chambers to move said valve to decrease the transmission drive ratio.

14. A variable speed friction transmission for an engine driven vehicle comprising in combination, an engine driven power input shaft, a power delivery shaft, means providing a drive connection between said shafts comprising sets of intermeshing friction discs carried by and rotatable with said shafts, respectively, a movable carrier rotatably supporting one of said shafts and one of said sets of friction discs therein, a fluid pressure responsive servo for varying the position of said carrier to change the transmission drive ratio, a fluid pressure source, drive ratio control means including a drive ratio control valve connected to said source and to said servo for controlling the admission of fluid pressure to and exhaust of pressure from said servo, means for moving said valve in response to movement of said carrier, a valve control servo including a piston connected to said valve, control chambers at opposite sides of said piston, driver actuated valve means for directing a variable pressure to one of said control chambers, and speed controlled valve means for directing a variable pressure to the other of said control chambers, the fluid pressure in said control chambers, respectively, acting in opposition to each other to actuate said piston and said shift valve to control the transmission drive ratio.

15. A variable speed friction transmission for an engine driven vehicle comprising in combination, an engine driven power input shaft, a power delivery shaft, a set of friction discs on said engine driven shaft for rotation therewith, a set of friction discs on said power delivery shaft in mesh with said first mentioned set of friction discs for driving said power delivery shaft, a movable carrier rotatably supporting one of said shafts and one of said sets of friction discs therein, a hydraulic servo for varying the position of said carrier to change the transmission drive ratio, a fluid pressure source, a drive ratio control valve connected to said source and said servo for controlling the admission of fluid pressure to and exhaust of pressure from said servo, a connection between said valve and said carrier, a valve control servo including a piston connected to said valve, control chambers at opposite sides of said piston, a driver operated valve for directing a variable pressure to one of said control chambers to downshift the transmission drive ratio, and a hydraulic governor valve hydraulically connected to the other of said control chambers for delivering a variable fluid pressure to said other control chamber, said governor being effective to deliver a variable pressure which increases with increase in vehicle speed and effective in said last-mentioned control chamber to yieldably bias said piston to move said drive ratio control valve to upshift the transmission drive ratio.

16. A variable speed friction transmission for an engine driven vehicle comprising in combination, an engine driven power input shaft, a power delivery shaft, a set of friction discs on said engine driven shaft for rotation therewith, a set of friction discs on said power delivery shaft in mesh with said first set of friction discs for driving said power delivery shaft, a movable carrier rotatably supporting one of said shafts and one of said sets of friction discs therein, a fluid pressure responsive servo for varying the position of said carrier to change the transmission drive ratio, a fluid pressure source, a drive ratio control valve connected to said source and to said servo for controlling the admission of pressure to and exhaust of pressure from said servo, means connecting said valve to said carrier, a valve control servo including a movable member connected to said valve through said means connecting said valve to said carrier, control chambers at opposite sides of said movable member, a driver operable pressure metering valve adapted to deliver a variable pressure to one of said control chambers to bias said movable member and said drive ratio control valve to downshift the transmission drive ratio, and a speed responsive governor valve adapted to deliver a variable pressure to the other of said control chambers to bias said movable member and said drive ratio control valve to upshift the transmission drive ratio.

17. A variable speed friction transmission for an engine driven vehicle comprising in combination, an engine driven power input shaft, a power delivery shaft, a set of friction discs on said engine driven shaft for rotation therewith, a set of friction discs on said power delivery shaft in mesh with said first set of friction discs for driving said power delivery shaft, a movable carrier rotatably supporting one of said shafts and one of said sets of friction discs therein, a fluid pressure responsive servo for changing the position of said carrier to change the transmission drive ratio, a fluid pressure source, a drive ratio control valve connected to said source and to said servo for controlling the admission of fluid pressure to and exhaust of pressure from said servo, linkage mechanism connecting said valve to said carrier, a valve control servo including a movable member connected to said valve through said linkage mechanism, control chambers at opposite sides of said movable member, an accelerator pedal controlled pressure metering valve for delivering a variable fluid pressure to one of said control chambers, the pressure in said one control chamber being effective to bias said movable member and said drive ratio control valve to downshift the transmission drive ratio as said accelerator pedal is moved to increase the torque demand on the engine, and a vehicle speed responsive governor valve adapted to deliver variable pressure to the other of said control chambers, the pressure in the other of said control chambers being increased with increase in vehicle speed to bias said movable member and said drive ratio control valve to upshift the transmission drive ratio with increase in vehicle speed.

18. A variable speed friction transmission comprising in combination, an engine driven power input shaft, a power delivery shaft, means providing a drive train between said shafts comprising sets of intermeshing friction discs carried by and rotatable with said shafts, respectively, a movable carrier supporting one of said shafts and one of said sets of friction discs therein, a fluid pressure source, fluid pressure responsive servo mechanism for applying a contact loading force to said discs to prevent slippage of said discs with respect to each other, passage means connecting said servo mechanism to said source, a pressure regulator valve connected to said passage means for controlling the pressure applied to said servo mechanism, speed responsive means for controlling said pressure regulator valve, a fluid pressure responsive servo for controlling the position of said carrier to control the transmission drive ratio, a drive ratio control valve connected to said passage and to said servo, linkage mechanism connecting said drive ratio control valve to said carrier, a piston connected to said linkage mechanism, control chambers at opposite sides of said piston, a driver operable pressure metering valve effective to deliver a variable fluid pressure to one of said control chambers to move said piston and drive ratio control valve to downshift said transmission, and a vehicle speed responsive governor valve connected to the other of said control chambers, said governor valve being effective in response to increase in vehicle speed to increase the fluid pressure in the other of said control chambers to move said piston and said drive ratio control valve to upshift said transmission.

19. A variable speed friction transmission for an engine driven vehicle comprising in combination, an engine driven shaft, a power delivery shaft, means providing a drive connection between said shafts comprising sets of intermeshing friction discs carried by and rotatable with said shafts, respectively, a movable carrier rotatably supporting one of said shafts and one of said sets of friction discs therein, a fluid pressure responsive servo for varying the position of said carrier to change the transmission drive ratio, a flud pressure source, drive ratio control means including a drive ratio control valve connected to said source and to said servo for controlling the admission of fluid pressure to and exhaust of pressure from said servo, linkage mechanism connecting said valve to said carrier for moving said valve in response to movement of said carrier, a piston connected to said valve through said linkage means, control chambers at opposite sides of said piston, spring means in one of said control chambers yieldably biasing said piston to position said drive ratio control valve to connect said servo to exhaust to downshift the transmission, a driver operable pressure metering valve effective to deliver a variable pressure to said one control chamber, a vehicle speed controlled governor valve effective to deliver a variable pressure to the other of said control chambers, the fluid pressure in said control chambers acting in opposition to each other on said piston to control the position of said piston and said drive ratio control valve to control the admission of fluid pressure to and exhaust of pressure from said servo.

20. A transmission as set forth in claim 19 including limit stops in each of said control chambers for limiting the range of movement of said piston.

References Cited in the file of this patent

UNITED STATES PATENTS

| 888,265 | Ruland | May 19, 1908 |
| 1,823,226 | Abbott | Sept. 15, 1931 |
| 2,222,281 | Beier | Nov. 19, 1940 |
| 2,586,260 | Rennerfelt | Feb. 19, 1952 |
| 2,619,841 | Von Kreudenstein | Dec. 2, 1952 |
| 2,727,397 | Jorgensen | Dec. 20, 1955 |
| 2,849,885 | Beier | Sept. 2, 1958 |

UNITED STATES PATENT OFFICE
CERTIFICATE OF CORRECTION

Patent No. 3,006,206                  October 31, 1961

Oliver K. Kelley et al.

It is hereby certified that error appears in the above numbered patent requiring correction and that the said Letters Patent should read as corrected below.

Column 7, lines 20 and 21, strike out "(for any given drive of gear 156 will drop below the correct output shaft speed"; column 10, line 4, after "power" insert -- input --; column 13, line 27, before "ratio" insert -- drive --.

Signed and sealed this 10th day of April 1962.

(SEAL)
Attest:

ERNEST W. SWIDER                  DAVID L. LADD Attesting Officer                  Commissioner of Patents